United States Patent
Chang (10) Patent No.: US 7,670,020 B2
(45) Date of Patent: *Mar. 2, 2010

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 224 days.

This patent is subject to a terminal disclaimer.

(21) Appl. No.: 11/861,311

(22) Filed: Sep. 26, 2007

(65) Prior Publication Data

US 2009/0010024 A1 Jan. 8, 2009

(30) Foreign Application Priority Data

Jul. 4, 2007 (CN) .................. 2007 1 0200999

(51) Int. Cl.
*F21V 8/00* (2006.01)
*G09F 13/04* (2006.01)

(52) U.S. Cl. .............. 362/97.1; 362/620; 362/628; 362/612; 362/626; 362/97.3

(58) Field of Classification Search .......... 362/600–634, 362/97.1–97.4
See application file for complete search history.

(56) References Cited

U.S. PATENT DOCUMENTS

| 6,752,505 | B2 * | 6/2004 | Parker et al. | 362/627 |
| 6,925,243 | B2 * | 8/2005 | Lin | 385/146 |
| 7,160,016 | B2 * | 1/2007 | Yu et al. | 362/620 |
| 7,422,357 | B1 * | 9/2008 | Chang | 362/602 |
| 7,458,714 | B2 * | 12/2008 | Chang | 362/626 |
| 2007/0147073 | A1 * | 6/2007 | Sakai et al. | 362/607 |
| 2007/0147089 | A1 * | 6/2007 | Lin et al. | 362/616 |

* cited by examiner

*Primary Examiner*—Stephen F Husar
*Assistant Examiner*—James W Cranson
(74) *Attorney, Agent, or Firm*—Frank R. Niranjan (57) ABSTRACT

An exemplary optical plate includes at least one transparent plate unit. The transparent plate unit includes a first surface, a second surface, a plurality of first protrusions, a plurality of second protrusions and a lamp-receiving portion. The second surface is opposite to the first surface. The first protrusions are formed at the first surface, and each first protrusion is a rectangular pyramidal protrusion. The second protrusions are formed at the second surface, and each second protrusion is a conical frustum protrusion. The lamp-receiving portion is defined in one of the first surface and the second surface. A backlight module using the optical plate is also provided.

17 Claims, 9 Drawing Sheets

OPTICAL PLATE AND BACKLIGHT MODULE USING THE SAME

CROSS-REFERENCE TO RELATED APPLICATIONS

This application is related to nineteen co-pending U.S. patent applications, which are: application Ser. No. 11/835,425, Ser. No. 11/835,426, Ser. No. 11/835,427, Ser. No. 11/835,428, Ser. No. 11/835,429, Ser. No. 11/835,430, and Ser. No. 11/835,431, filed on Aug. 8, 2007, and all entitled "OPTICAL PLATE AND BACKLIGHT MODULE USING THE SAME", application Ser. No. 11/836,799 filed on August 10, and entitled "OPTICAL PLATE AND BACKLIGHT MODULE USING THE SAME", application Ser. No. 11/842,170, filed on Aug. 21, 2007, and entitled "OPTICAL PLATE AND BACKLIGHT MODULE USING THE SAME", application Ser. No. 11/843,670 and Ser. No. 11/843,669, filed on Aug. 23, 2007, and both entitled "OPTICAL PLATE AND BACKLIGHT MODULE USING THE SAME", application Ser. No. 11/845,100, filed on Aug. 27, 2007, and entitled "OPTICAL PLATE AND BACKLIGHT MODULE USING THE SAME", application Ser. No. 11/845,790, Ser. No. 11/845,792, Ser. No. 11/845,793, and Ser. No. 11/845,794, filed on Aug. 28, 2007, all entitled "OPTICAL PLATE AND BACKLIGHT MODULE USING THE SAME", and application Ser. No. 11/850,040 and Ser. No. 11/850,041, filed on Sep. 5, 2007, both entitled "OPTICAL PLATE AND BACKLIGHT MODULE USING THE SAME", and application Ser. No. 11/861,310, filed on Sep. 26, 2007, and entitled "OPTICAL PLATE AND BACKLIGHT MODULE USING THE SAME". In all these co-pending applications excepting application Ser. No. 11/845,790, the inventor is Shao-Han Chang. In application Ser. No. 11/845,790, the inventor is Shao-Han Chang and Fen Chen. All of the co-pending applications have the same assignee as the present application.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

In a liquid crystal display device, liquid crystal is a substance that does not itself radiate light. Instead, the liquid crystal relies on light received from a light source, in order that the liquid crystal can facilitate the displaying of images. In the case of a typical liquid crystal display device, a backlight module powered by electricity supplies the needed light.

Figure 9:
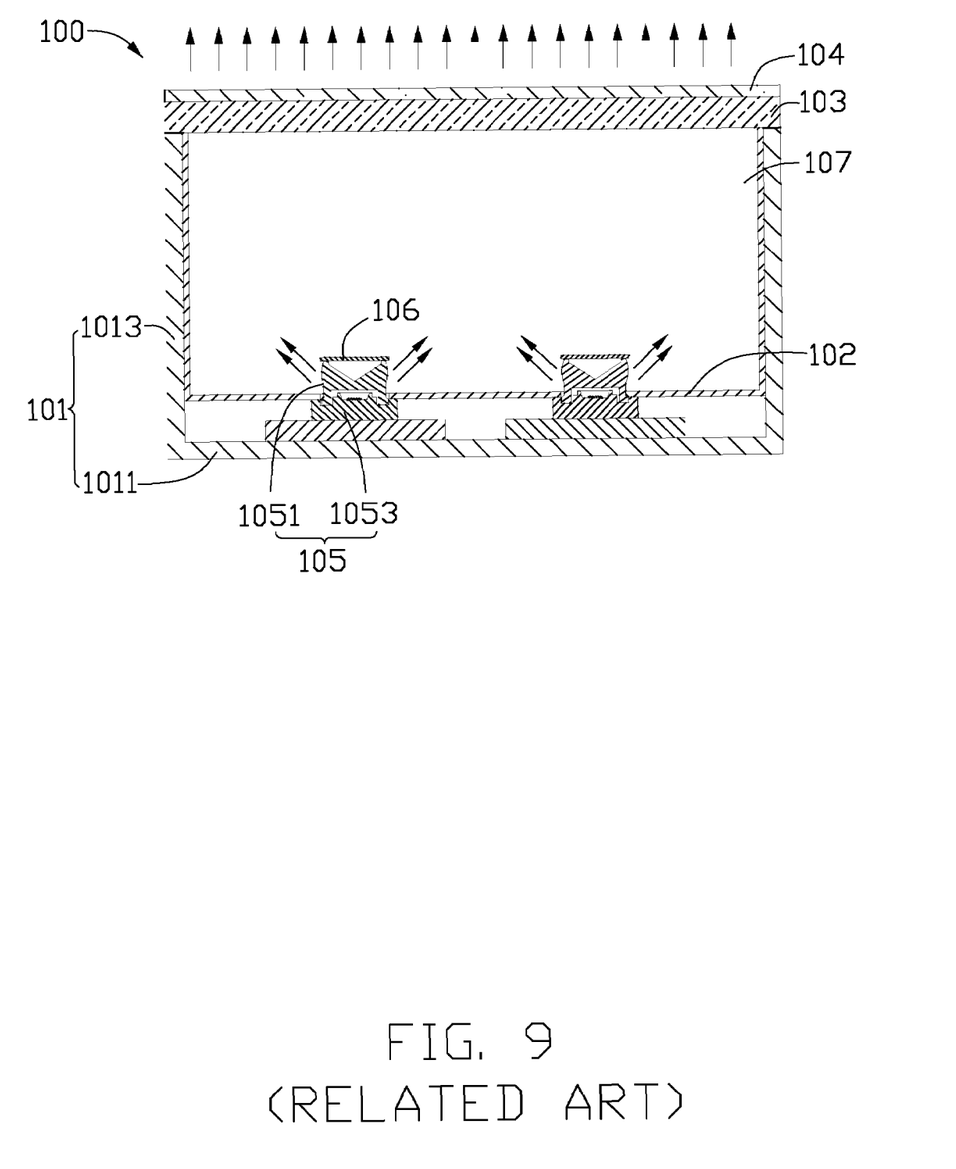
FIG. 9 is a side cross-sectional view of a conventional backlight module.

FIG. 9 represents a typical direct type backlight module 100. The backlight module 100 includes a housing 101, a light reflective plate 102, a light diffusion plate 103, a prism sheet 104, and a plurality of light emitting diode 105 (hereinafter called LED). The housing 101 includes a rectangular base 1011 and four sidewalls 1013 extending from a periphery of the base 1011. The base 1011 and the four sidewalls 1013 cooperatively define a chamber 107. Each LED 105 includes a base portion 1053 and a light-emitting portion 1051 disposed on the base portion 1053. The LEDs 105 are electrically connected to a printed circuit board (not labeled), and the printed circuit board is fixed to the base 1011 of the housing 101. The light reflective plate 102 is disposed on the LEDs 105 in the chamber 107. The light reflective plate 102 defines a plurality of through holes (not labeled) that allows the light-emitting portions 1051 of the LED 105 to pass through and to emit light to be transmitted to the light diffusion plate 103. The light diffusion plate 103 is stacked on the prism sheet 104 in the chamber 107. Light emitted from the LEDs 105 is substantially reflected by the light reflective sheet 102 to the light diffusion plate, diffused uniformly in the light diffusion plate 103, and exit the prism sheet 104 as surface light.

Generally, a plurality of dark areas may occur because of the reduced intensity of light between adjacent LEDs 105. In the backlight module 100, each LED 105 further includes a reflective sheet 106 disposed on the top of the light-emitting portion 1051, configured for decreasing the brightness of a portion of the backlight module 100 above the LED 105. However, the brightness of the backlight module 100 is still not uniform.

What is needed, therefore, is a new optical plate and a backlight module using the optical plate that can overcome the above-mentioned shortcomings.

SUMMARY

An optical plate according to a preferred embodiment includes at least one transparent plate unit. The transparent plate unit includes a first surface, a second surface, a plurality of first protrusions, a plurality of second protrusions and a lamp-receiving portion. The second surface is opposite to the first surface. The first protrusions are formed at the first surface, each protrusion including three side surfaces connected with each other, a transverse width of each side surface decreasing along a direction away from the base surface of the first protrusions. The second protrusions are formed at the second surface, each protrusion having circular cross-sections taken along a plane parallel to its base surface thereof, a diameter of the circular cross-sections decreasing along a direction away from its base surface thereof. The lamp-receiving portion is defined in one of the first surface and the second surface.

A backlight module according to a preferred embodiment includes a housing, a point light source, an optical plate, and a light diffusion plate. The housing includes a base and a plurality of sidewalls extending from a periphery of the base, the base and the sidewalls cooperatively forming an opening. The point light source is disposed on the base, each point light source having a light-emitting portion. The same optical plate as described in the previous paragraph is employed in this embodiment. The light-emitting portion of the point light source is inserted in the lamp-receiving portion of the optical plate correspondingly. The light diffusion plate is disposed on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
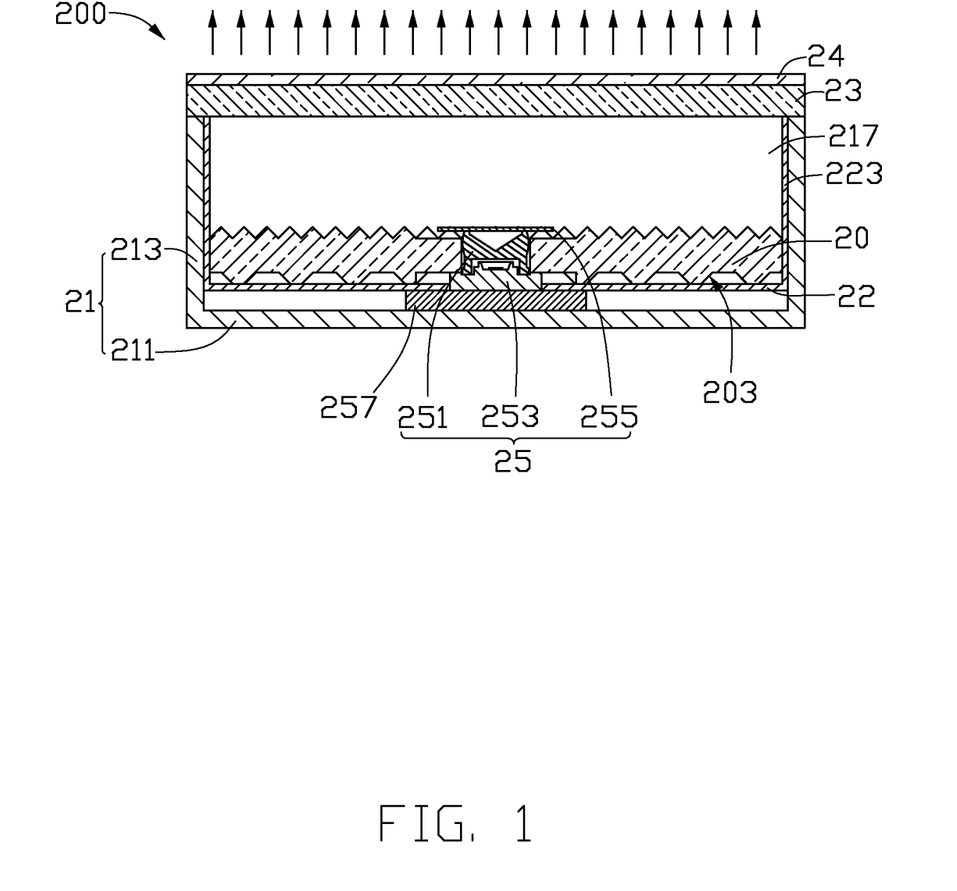
FIG. 1 is a side cross-sectional view of a backlight module using an optical plate according to a first preferred embodiment of the present invention.

Referring to FIG. 1, a backlight module 200 in accordance with a first preferred embodiment is shown. The backlight module 200 includes an optical plate 20, a housing 21, a light reflective plate 22, a light diffusion plate 23, an LED 25, and a reflective member 255. The housing 21 includes a rectangular base 211 and four sidewalls 213 extending around a periphery of the base 211. The sidewalls 213 cooperatively form an opening 217. The light diffusion plate 23 is disposed on the housing 21 over the opening 217. The optical plate 20, the light reflective plate 22 and the LED 25 are received in the housing 21.

Figure 2:
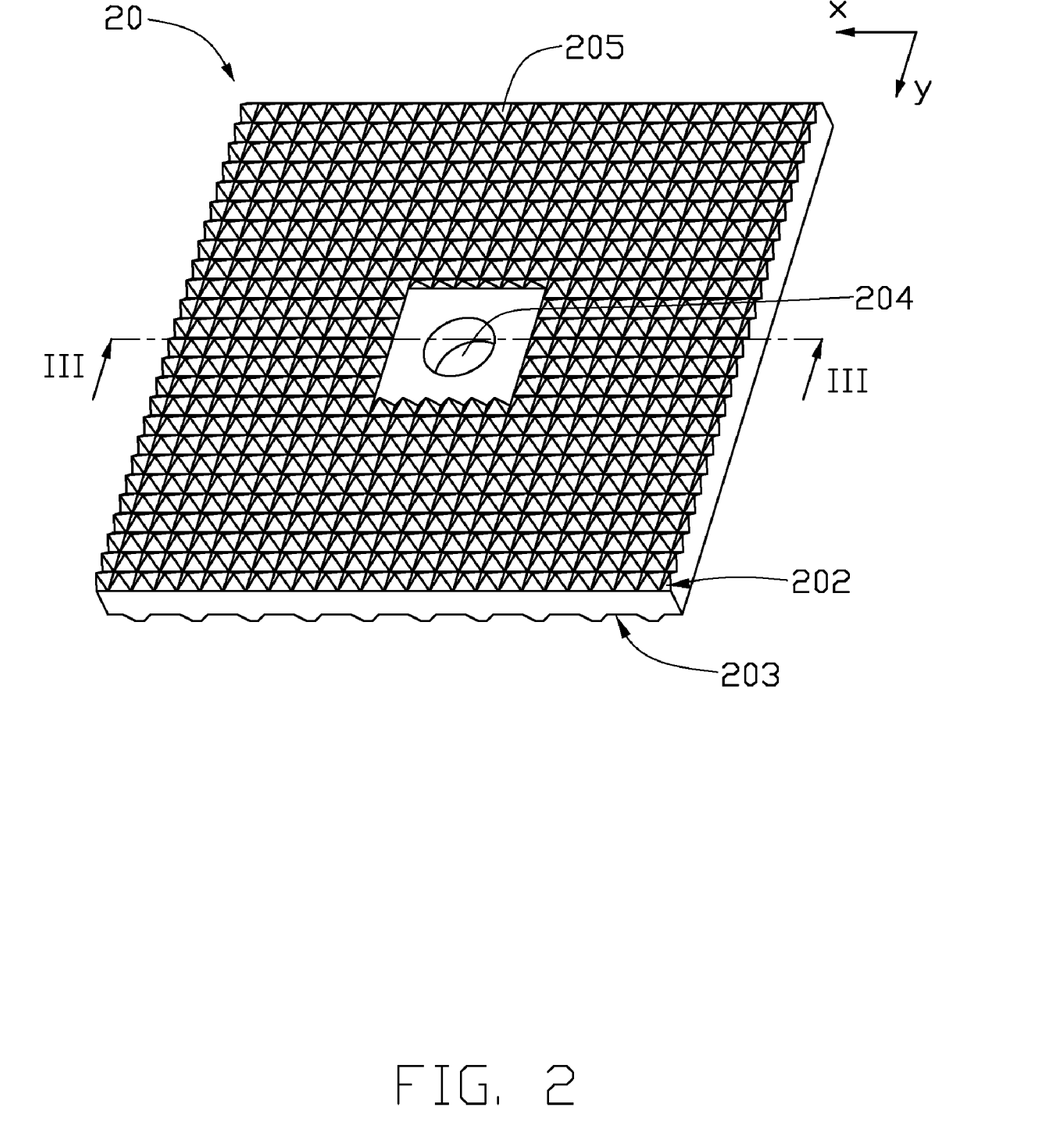
FIG. 2 is an isometric view of the optical plate of FIG. 1.
Figure 3:
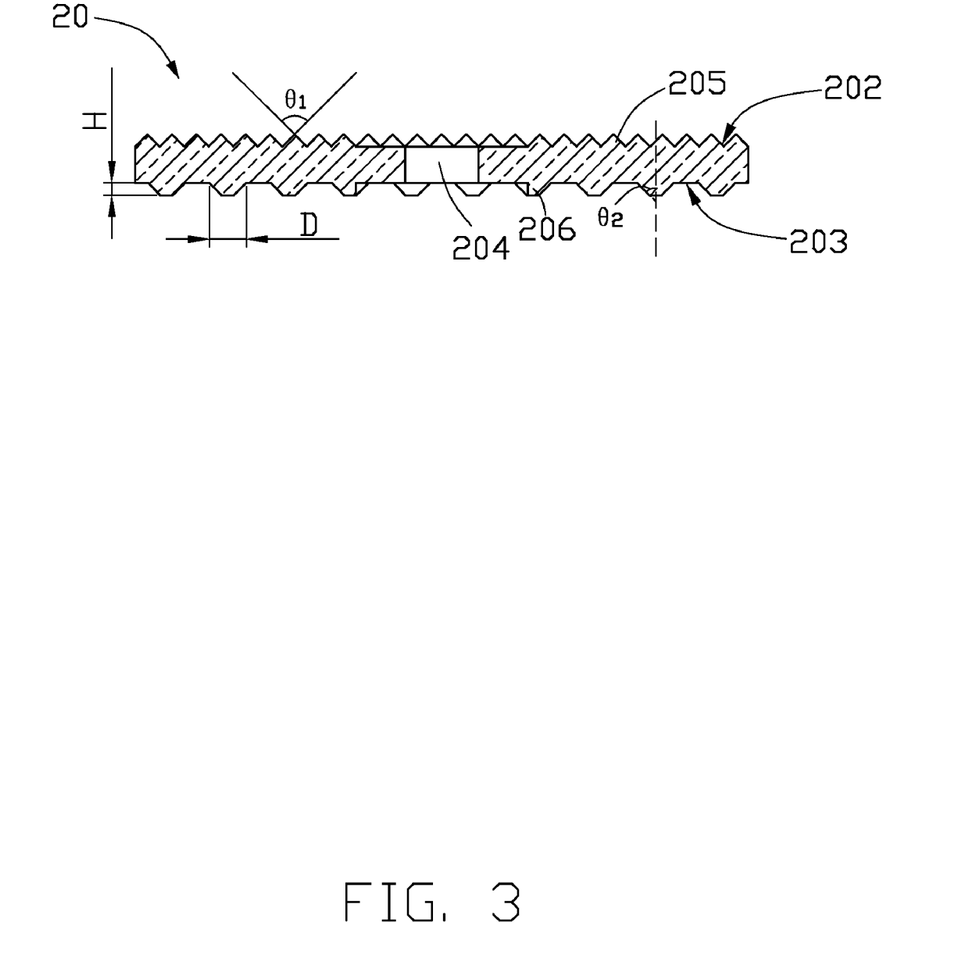
FIG. 3 is a cross-sectional view taken along line III-III of FIG. 2.
Figure 4:
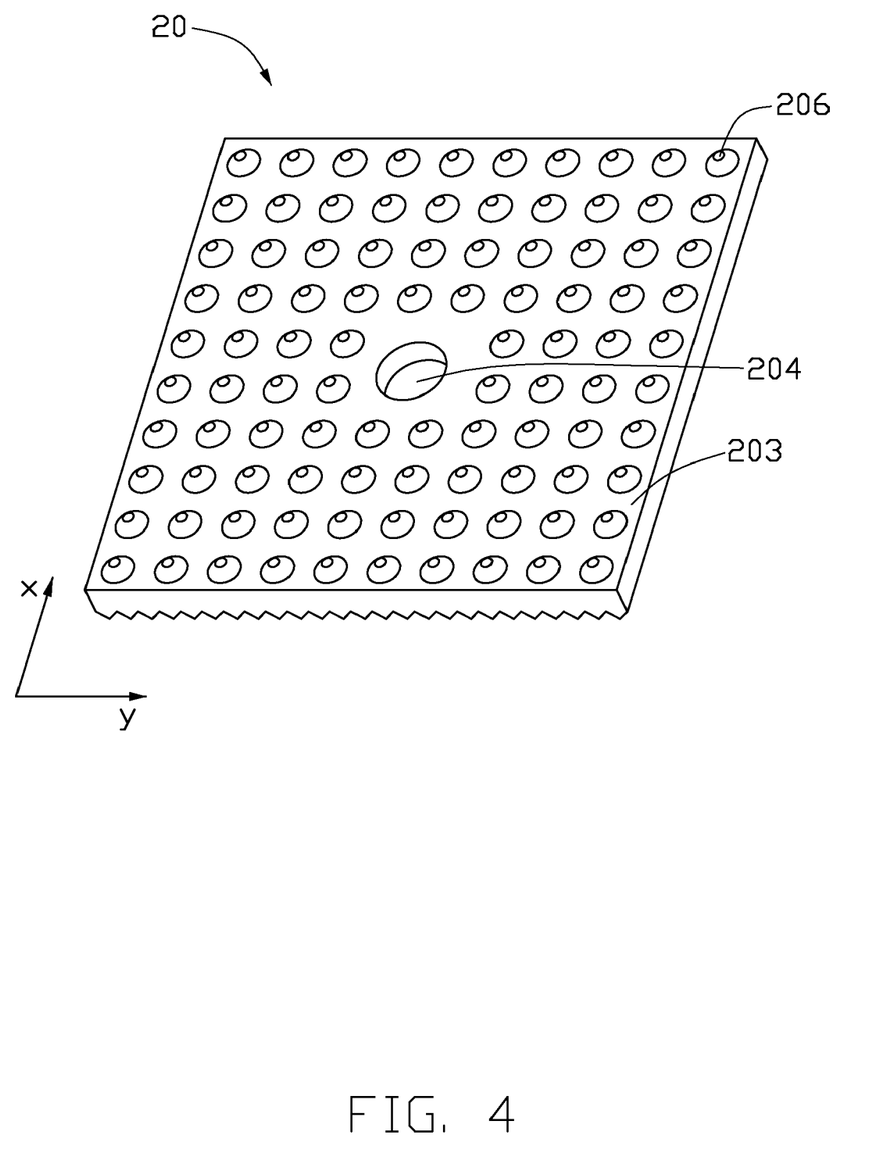
FIG. 4 is similar to FIG. 2, but viewed from another aspect.

Referring to FIGS. 2 through 4, the optical plate 20 is a transparent square plate, and can be mounted into the housing 21. The optical plate 20 includes a light output surface 202, and a bottom surface 203 in another side of the optical plate 20 opposite to the light output surface 202. A plurality of first protrusions 205 are formed on the light output surface 202, and a plurality of second protrusions 206 are formed on the bottom surface 203. The optical plate 20 further includes a lamp-receiving portion 204 defined in a center of the bottom surface 203. In the first preferred embodiment, the lamp-receiving portion 204 is a through hole that communicates between the light output surface 202 and the bottom surface 203. The optical plate 20 can be made from material selected from the group consisting of polycarbonate (PC), polymethyl methacrylate (PMMA), polystyrene (PS), copolymer of methylmethacrylate and styrene (MS), and any suitable combination thereof.

Referring to FIG. 2, the first protrusions 205 are distributed on the light output surface 202 in a first matrix manner. The rows and columns of the first protrusions 205 in the matrix are parallel to the edges of the optical plate (along the X-axis and Y-axis direction) correspondingly. Each first protrusion 205 is a rectangular pyramid protrusion, which includes four side surfaces (not labeled) connected with each other. A transverse width of each side surface of first protrusions 205 decreases along a direction away from the base surface of the first protrusions 205. A pitch between adjacent first protrusions 205 along an X-axis direction or a Y-axis direction is configured to be in a range from about 0.025 millimeters to about 2 millimeters. Referring to FIG. 3, a dihedral angle $\theta_1$, defined by side surfaces on opposite sides of each of the first protrusions 205 is configured to be in a range from about 60 degrees to about 120 degrees. It is to be understood that, the first protrusions 205 can be three-sided (triangular) pyramidal protrusions, five-sided (pentagonal) pyramidal protrusions, multi-sided (polygonal) pyramidal protrusions, or frustums of these.

Figure 5:
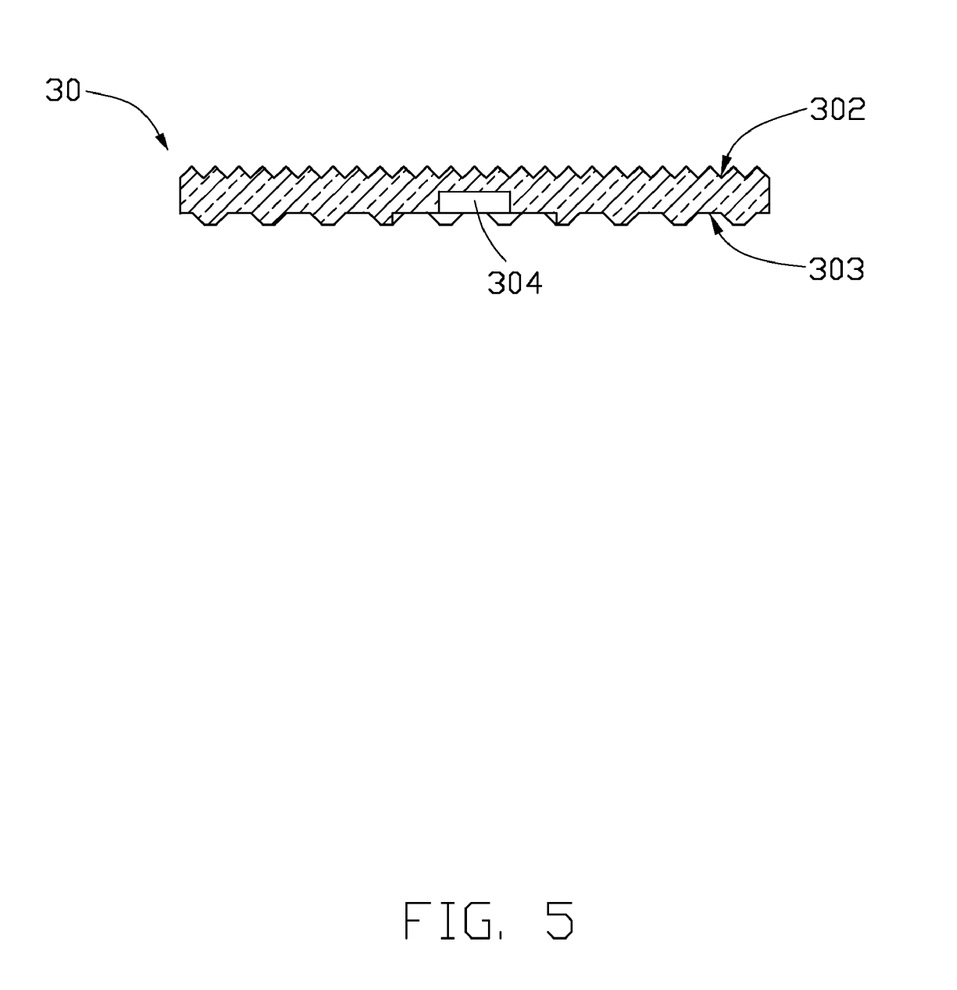
FIG. 5 is a side cross-sectional view of an optical plate according to a second preferred embodiment of the present invention.

Referring to FIG. 5, the second protrusions 206 are distributed on the bottom surface 203 in a second matrix manner. Each second protrusion 206 has circular cross-sections taken along a plane parallel to a base surface of the second protrusion 206, a diameter of the circular cross-sections decreases along a direction away from the base surface. In this embodiment, each second protrusion 206 is a conical frustum protrusion. A diameter D of the base surface of each second protrusion 206 is configured to be in a range from about 0.02 millimeters to about 4 millimeters. A height H of each second protrusion 206 is configured to be in a range from about 0.01 millimeters to about 3 millimeters. Referring to FIG. 3, an angle $\theta_2$ defined by a conical surface of each second protrusion 206 relative to its axis is equal to or less than 60 degrees and greater than zero. It is to be understood that, the second protrusion 206 can be selected from conical frustum protrusions and stacked conical frustum protrusions (such as at least two conical frustum protrusions stacked together).

Referring to FIGS. 1 and 2, the LED 25 is a side-lighting type LED, which includes a base portion 253, and a light-emitting portion 251 disposed on the base portion 253. The LED 25 is electrically connected to a printed circuit board 257 that is fixed to the base 211 of the housing 21. The light-emitting portion 251 of the LED 25 is inserted into the lamp-receiving portion 204 of the optical plate 20 with the light output surface 202 of the optical plate 20 facing the light diffusion plate 23. The light reflective plate 22 defines a through hole (not labeled). The light reflective plate 22 is disposed under the bottom surface 203 of the optical plate 20 and the LED 25 is passed through the light reflective plate 22 via the through hole. The reflective member 255 is disposed on the top of the light-emitting portion 251 of the LED 25.

Light emitted from the light-emitting portion 251 of the LED 25 enters the optical plate 20 via an inner surface of the lamp-receiving portion 204. A significant amount of light enters the optical plate 20. Since the second protrusions 206 have a plurality of curved side surfaces, a great amount of light is directly reflected by the second protrusions 206 and exits from the light output surface 202 quickly.

In addition, the first protrusions 205 can condense and collimate emitted light, thereby improving a brightness of the backlight module 200. Furthermore, because the LED 25 is positioned in the lamp-receiving portion 204, light is uniformly outputted from the light output surface 202 of the optical plate 20 except that the portion above the LED 25 has a relatively low light output. Light exiting the optical plate 20 can be further substantially mixed in a chamber between the optical plate 20 and the light diffusion plate 23, before exiting the light diffusion plate 23 as uniform surface light. A distance from the LED 25 to the light diffusion plate 23 may be configured to be very small, with little or no risk of having dark areas on the portion of the backlight module 200 directly above the LED 25. Accordingly, the backlight module 200 can have a compact configuration while still providing good, uniform optical performance.

It should be pointed out that, the light reflective plate 22 can be omitted. In an alternative embodiment, a high reflectivity film can be deposited on inner surface of the base 211 and the sidewalls 213 of the housing 21. In another alternative embodiment, the housing 21 is made of metal materials, and has high reflectivity inner surfaces.

It is to be understood that, in order to improve brightness of the backlight module 200 within a specific viewing range, the backlight module 200 can further include a prism sheet 24 disposed on the light diffusion plate 23. In addition, in order to improve a light energy utilization rate of the backlight module 200, four reflective sidewalls 223 extending around a periphery of the light reflective plate 22 and in contact with the corresponding sidewalls 213 of the housing 21 can be further configured in the backlight module 200. Furthermore, the rows or columns of the first protrusions 205 and the second protrusions 206 may not be parallel to the edges of the optical plate but have other alignments or orientations.

Referring to FIG. 5, an optical plate 30 in accordance with a second preferred embodiment is shown. The optical plate 30 is similar in principle to the optical plate 20 of the first embodiment, however a lamp-receiving portion 304 defined at the bottom surface 303 is blind hole.

Figure 6:
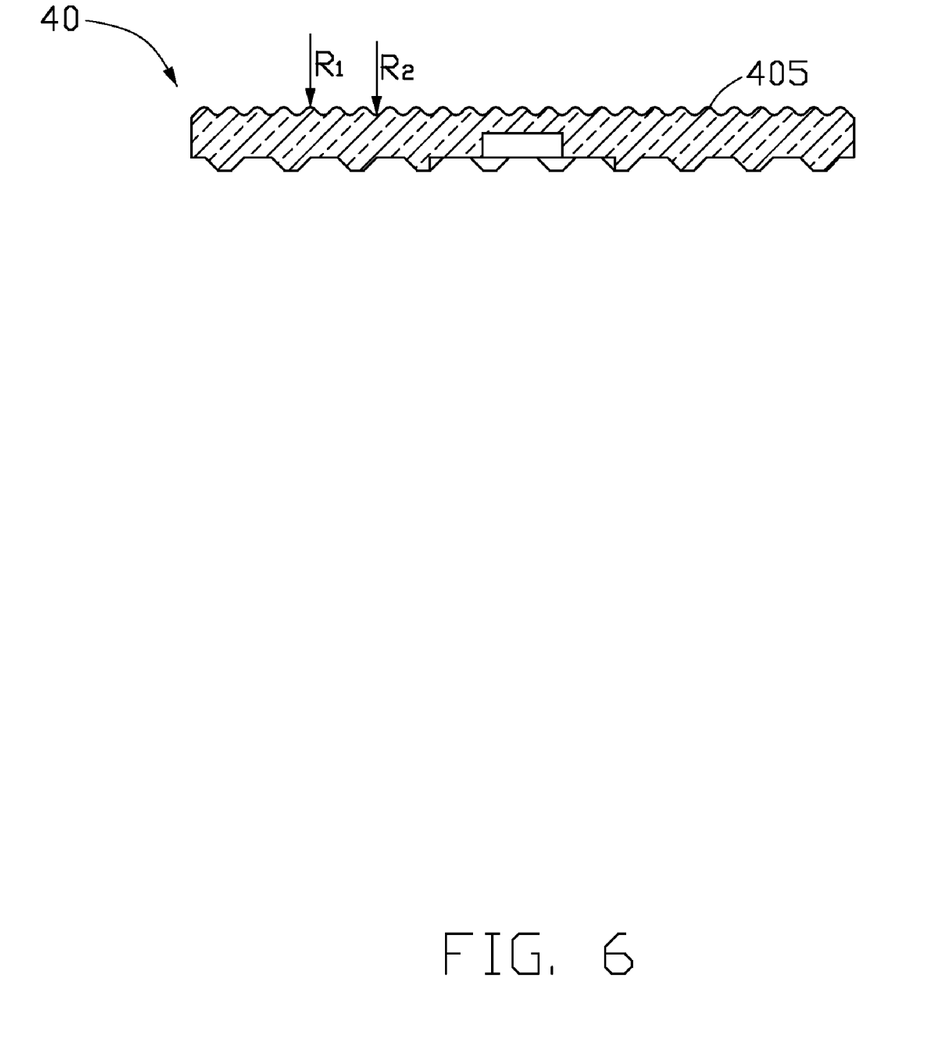
FIG. 6 is an isometric view of an optical plate according to a third preferred embodiment of the present invention.

Referring to FIG. 6, an optical plate 40 in accordance with a third preferred embodiment is shown. The optical plate 40 is similar in principle to the optical plate 20 of the first embodiment, except that either a top edge of each first protrusion 405 or a bottom edge defined by the boundary formed by the bases of two adjacent V-shaped protrusions 405 are rounded. The curvature of this rounded surface is defined by a sphere of radius R. The radius $R_1$ of the rounded top edge and the radius $R_2$ of the rounded bottom edge are equal to or less than 1.1 millimeters and greater than zero.

Figure 7:
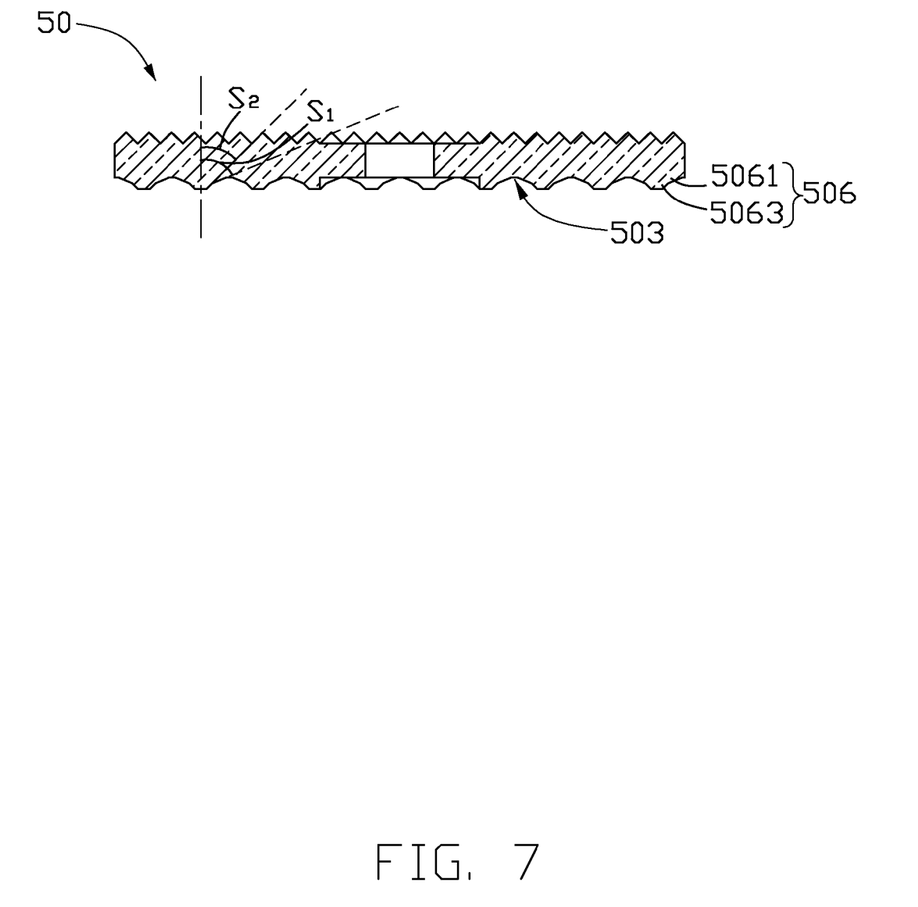
FIG. 7 is an exploded, isometric view of an optical plate according to a fourth preferred embodiment of the present invention.

Referring to FIG. 7, an optical plate 50 in accordance with a fourth preferred embodiment is shown. The optical plate 50 is similar in principle to the optical plate 20, except that each second protrusions 506 includes a first conical frustum 5061 in contact with a bottom surface 503, and a second conical frustum 5063 on the top of the first conical frustum 5061. That is, the second conical frustum 5063 extends from the first conical frustum 5063. An angle $S_1$ defined by a side surface of first conical frustum 5061 relative to its axis is equal to or less than 60 degrees and greater than zero, and an angle $S_2$ defined by a side surface of second conical frustum 5063 relative to its axis is equal to or greater than $S_2$.

Figure 8:
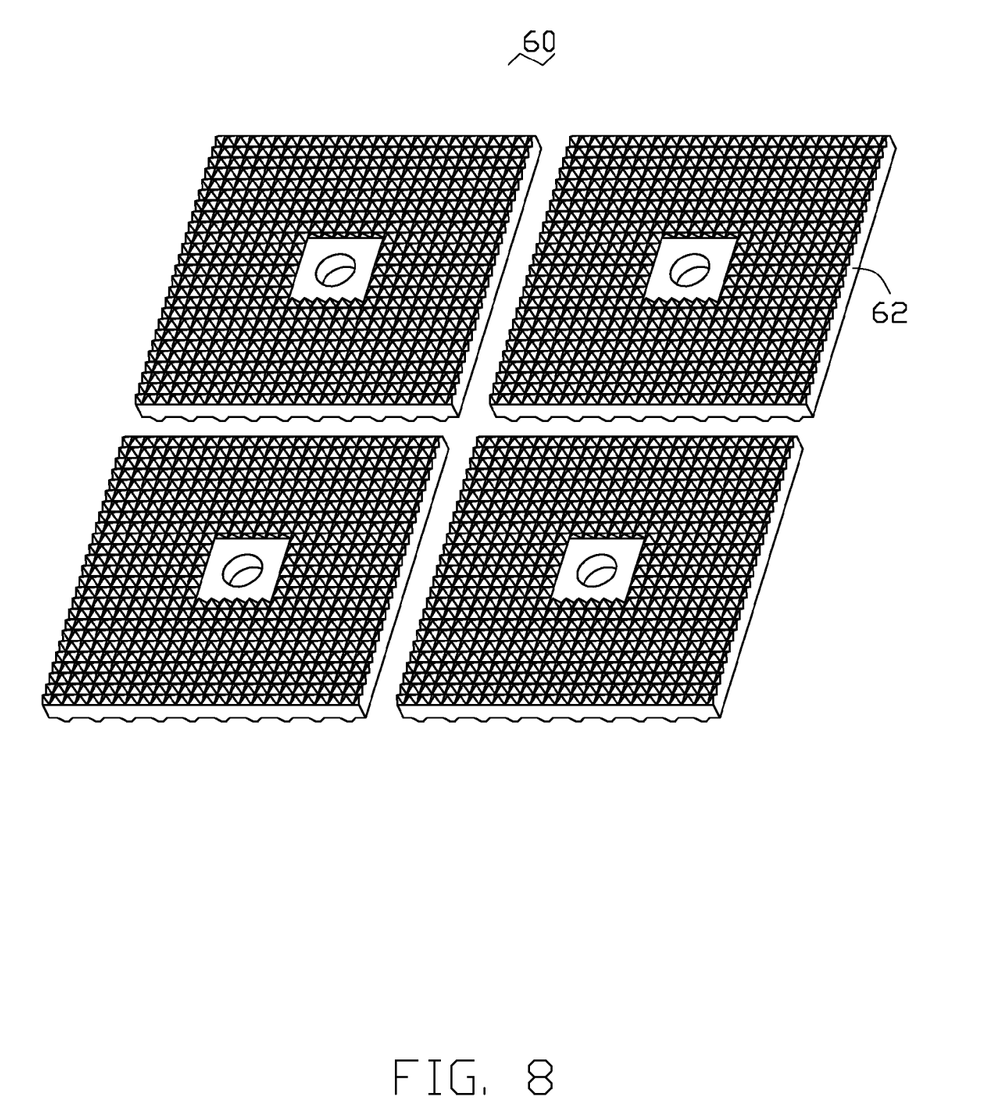
FIG. 8 is an exploded, isometric view of an optical plate according to a fifth preferred embodiment of the present invention.

Referring to FIG. 8, a combined optical plate 60 in accordance with a fourth preferred embodiment is shown. The optical plate 60 includes four transparent plate units 62. Each transparent plate unit 62 is similar if not identical to the optical plate 20 of the first embodiment. The four transparent plate units 62 can be combined with each other to form the combined optical plate 60. It is to be understood that four LEDs and the combined optical plate 60 can be mounted into a housing to form a large size backlight module.

It is noted that the scope of the present display devices is not limited to the embodiments described above. For example, in the backlight module 200, not only can the optical plate 20 be positioned in the housing 21 with the light output surface 202 facing the light diffusion plate 23, but can also be positioned in the housing 21 with the bottom surface 203 facing the light diffusion plate 23. That is, the first protrusions 205 are formed at a first surface of the optical plate 20, and the second protrusions 206 are formed at a second surface of the optical plate 20. The first surface is selected from one of the light output surface 202 and the bottom surface 203, and the second surface is selected from the other one of the light output surface 202 and the bottom surface 203. Furthermore, in order to increase brightness of light illumination provided by the backlight module, or mix light with different wavelengths generated by different light emitting diodes to produce white light, in above optical plate, each transparent plate unit can include a plurality of lamp-receiving portions for receiving the point light sources.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate unit having:
   a first surface;
   a second surface opposite to the first surface;
   a plurality of first protrusions formed at the first surface, each protrusion comprising at least three side surfaces connected with each other, a transverse width of each side surface decreasing along a direction away from the base surface of the first protrusions;
   a plurality of stacked conical frustum protrusions formed at the second surface; and
   at least a lamp-receiving portion defined in at least one of the first surface and the second surface.

2. The optical plate according to claim 1, wherein the first protrusions are selected from a group consisting of triangular pyramidal protrusions, rectangular pyramidal protrusions, pentagonal pyramidal protrusions, polygonal pyramidal protrusions, and frustums of these.

3. The optical plate according to claim 1, wherein the first protrusions are rectangular pyramidal protrusions, a dihedral angle defined side surfaces on opposite sides of each of the first protrusions is configured to be in a range from about 60 degrees to about 120 degrees.

4. The optical plate according to claim 1, wherein a pitch between adjacent first protrusions is in a range from about 0.025 millimeters to about 2 millimeters.

5. The optical plate according to claim 1, wherein a diameter of the base surface of each stacked conical frustum protrusion is configured to be in a range from about 0.02 millimeters to about 4 millimeters of the second, and a height of each stacked conical frustum protrusion is configured to be in a range from about 0.01 millimeters to about 3 millimeters.

6. The optical plate according to claim 1, wherein an angle defined by a side surface of each stacked conical frustum protrusion relative to its axis is equal to or less than 60 degrees and greater than zero.

7. The optical plate according to claim 1, wherein the lamp-receiving portion is selected from one of blind hole and through hole communicating between the first surface and the second surface.

8. The optical plate according to claim 1, wherein the optical plate includes a plurality of the transparent plate units, the transparent plate units being combined with each other.

9. A backlight module comprising:
   a housing having a base and a plurality of sidewalls extending from a periphery of the base, the base and the sidewalls cooperatively forming an opening;
   at least one point light source disposed on the base, each point light source having a light-emitting portion;
   an optical plate positioned in the housing, the optical plate including at least one transparent plate unit having:
   a first surface;
   a second surface opposite to the first surface;
   a plurality of first protrusions formed at the first surface, each protrusion comprising at least three side surfaces connected with each other, a transverse width of each side surface decreasing along a direction away from the base surface of the first protrusions;
   a plurality of stacked conical frustum protrusions formed at the second surface; and
   a lamp-receiving portion defined in at least one of the first surface and the second surface, wherein the light-emitting portion of the at least one point light source is inserted in the lamp-receiving portion; and a light diffusion plate disposed on the housing over the opening.

10. The backlight module according to claim 9, wherein the backlight module further comprising a light reflective plate defining a through hole therein, the light reflective plate being disposed underneath the optical plate, and the point light source passing through the light reflective plate via the through hole.

11. The backlight module according to claim 10, wherein the light reflective plate further comprises a plurality of reflective sidewalls extending from a periphery thereof and contact with the sidewalls of the housing.

12. The backlight module according to claim 9, wherein the housing is made of metal materials, and has high reflectivity inner surfaces.

13. The backlight module according to claim 9, further comprising a high reflectivity film deposited on inner surfaces of the base and the sidewalls of the housing.

14. The backlight module according to claim 9, further comprising a prism sheet disposed on the light diffusion plate.

15. The backlight module according to claim 9, wherein the first protrusions are selected from a group consisting of triangular pyramidal protrusions, rectangular pyramidal protrusions, pentagonal pyramidal protrusions, polygonal pyramidal protrusions, and frustums of these.

16. The backlight module according to claim 9, wherein the lamp-receiving portion is selected from one of blind hole and through hole communicating with the first surface and the second surface.

17. The backlight module according to claim 9, wherein the optical plate includes a plurality of the transparent plate units, the transparent plate units being combined with each other.

* * * * *